Aug. 20, 1963  A. E. BURCH  3,100,937
TAPE MEASURE
Filed Aug. 8, 1961
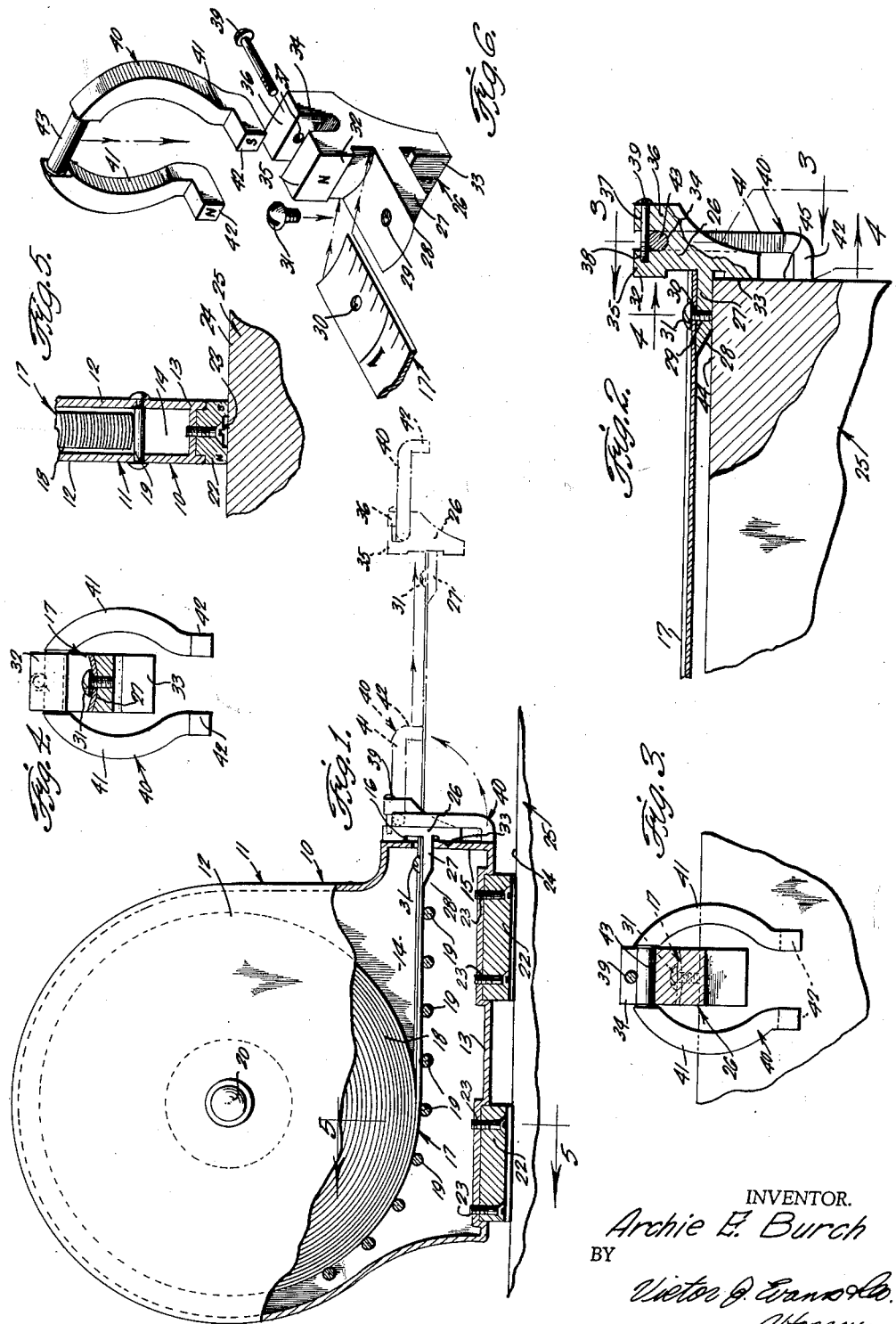
INVENTOR.
Archie E. Burch
BY
Victor J. Evans Co.
Attorneys

United States Patent Office 3,100,937
Patented Aug. 20, 1963

3,100,937
TAPE MEASURE
Archie E. Burch, 1428 Park St., Alameda, Calif.
Filed Aug. 8, 1961, Ser. No. 130,128
1 Claim. (Cl. 33—137)

The present invention relates to a tape measure and more particularly to a tape measure which includes or embodies magnetic holding means for facilitating the use of the tape measure.

The primary object of the present invention is to provide a tape measure which includes a magnetic means for helping to hold the device in place on an object such as a metal object and wherein there is also provided a magnetic means for selectively maintaining the tape in a retracted position in the case, and wherein there is also provided a magnetic means for helping to hold the tape immobile in an extended or adjusted position.

Another object of the present invention is to provide a tape measure which includes a manually operable member that can be gripped in order to facilitate extension of the tape to a desired length, so that with the present invention the customary or usual finger engaging ring on the end of the calibrated tape can be eliminated.

Another object of the present invention is to provide a device of the character described which may be utilized speedily and with precision by even inexperienced operators.

Further objects and advantages are to provide improved elements and arrangements thereof in a device of the character described that is economical to produce, durable in form, and conducive to the most economical use of materials and uniformity of members formed therefrom.

Still further objects and advantages will become apparent in the subsequent description in the specification.

In the drawings:

FIGURE 1 is an elevational view of the tape measure of the present invention, with parts broken away and in section.

FIGURE 2 is a fragmentary sectional view showing the tape in extended position and being held on a metal work piece or article by the magnetic means.

FIGURE 3 is a sectional view taken on the line 3—3 of FIGURE 2.

FIGURE 4 is a sectional view taken on the line 4—4 of FIGURE 2.

FIGURE 5 is a sectional view taken on the line 5—5 of FIGURE 1.

FIGURE 6 is a fragmentary perspective view showing certain of the parts disassembled for clarity of illustration.

Referring in detail to the drawings, the numeral 10 indicates the tape measure of the present invention which is shown to comprise a hollow case or housing which is indicated generally by the numeral 11, and the case 11 includes spaced parallel side portions 12 as well as a bottom portion 13, and the interior of the case 11 is hollow as indicated by the numeral 14, FIGURE 1. The case 11 further includes an end wall 15 which is provided with a slot 16 therein, and the numeral 17 indicates a calibrated flexible tape such as a metal tape which includes a coiled or rolled portion 18 that is arranged within the hollow interior 14, and the coiled portion 18 may be mounted on a shaft or pin 20 in the usual manner.

The tape 17 is adapted to engage a plurality of spaced parallel pins 19 which extend between the side portions 12 and which are connected thereto, and the pins 19 help guide the tape 17 as it moves in or out through the slots 16 in the end walls 15 of the case.

As shown in the drawings, there is provided a pair of spaced apart magnets 22 which are arranged externally of the case 11, and the magnets 22 are adapted to be affixed to the bottom portion 13 of the case, as for example by means of securing elements or rivets or screws 23. In FIGURE 1 the magnets 22 are shown arranged in engagement with a surface or portion 24 of a member 25, and the member 25 is adapted to be made of metal so as to permit the magnets such as the magnets 22 to exert the necessary holding action relative thereto.

As shown in the drawings, there is further provided a support unit which is indicated generally by the numeral 26, and the support unit 26 includes a lip or tongue 27 which is provided with a tapered or beveled surface 28, and the lip 27 is provided with threaded hole 29 which is adapted to register with a hole 30 in an end of the tape 17, FIGURE 6. The numeral 31 indicates a securing element or screw which is adapted to be extended through the hole or opening 30 and the screw 31 is adapted to threadedly engage the opening 29 in the lip 27 in order to maintain the tape 17 connected to the lip 27 of the support unit 26.

The support unit 26 is further provided with magnetized shoulders 32 and 33 which are arranged on opposite sides of the lip 27 for a purpose to be later described.

There is provided in the support unit 26 a recess or groove 34 which defines in the support unit spaced apart flanges 35 and 36. The flange 36 is provided with an opening 37 that registers with a threaded aperture or recess 38 in the flange 35, FIGURE 2, and the numeral 39 indicates a securing element which extends through the opening 37 and threadedly engages the aperture 38. A generally U-shaped or horseshoe shaped body member 40 includes a pair of arcuate legs 41 which have magnetic projections 42 on ends thereof, FIGURE 6, and the other ends of the legs 41 are interconnected or joined by cylindrical crosspiece 43, and the crosspiece 43 is swivelly arranged in the recess 34, and the crosspiece 43 is maintained in the recess 34 by means of the securing element 39.

As shown in FIGURE 2, the lip 27 may engage the surface such as the surface 44 of the member 25, and the magnetic projections 42 and the magnetic shoulder 33 are adapted to engage a surface such as the surface 45 in order to maintain the parts stationary in their desired position.

From the foregoing, it is apparent that there has been provided a tape measure, and in use with the parts arranged as shown in the drawings, it will be seen that the tape measure 10 can be conveniently supported or held on or against a surface such as the surface 24 of a metal member 25, due to the provision of the magnets 22. The magnets 22 are adapted to be secured to or formed integral with the portions such as the portions 13 of the case 11. When it is desired to move the case 11, the holding attraction of the magnets 22 on the metal member 25 can be overcome by manual pressure on the case in order to permit movement of the case to a different location as desired or required.

When the tape measure is not being used, the parts are adapted to be arranged in the solid line position of FIGURE 1, and it will be seen that in this solid line position of FIGURE 1, the lip 27 extends through the slot 16 in the end wall 15, and the tapered surface 28 of the lip 27 functions as a guiding surface so as to help facilitate insertion or projection of the lip 27 in through the slot 16. The pins 19 are suitably affixed to the side portions 12 of the case 11, and portions of the tape 17 are adapted to engage the pins 19 whereby the pins 19 help guide the tape as it moves in or out of the case through the slot 16.

When the parts are in the solid line position of FIGURE 1, that is when the tape measure is not being used, it will be seen that the magnetic shoulders or portions 32 and 33 will bear against the outer surface of the wall 15, and the wall 15 is adapted to be made of metal, whereby the magnets 32 and 33 will exert a holding action on the metal wall 15 in order to maintain the flexible tape 17 properly housed within the case so that the tape will not inadvertently unravel or move from its retracted position until it is to be used. Also, when the parts are in the solid line position of FIGURE 1, it will be seen that the magnetic projections 42 engage a portion of the outer surface of the wall 15 so that the body member 40 will be maintained in an out of the way position contiguous to the end wall 15 of the case.

When the tape is to be extended, as for example when a distance is to be measured, it is only necessary to manually grip the body member 40, and since the crosspiece 43 of the body member 40 is swivelly maintained in the groove 34 by means of the securing elements 39, it will be seen that by manually gripping the body member 40, the body member 40 can be swung from the solid line position of FIGURE 1 to the dotted line position of FIGURE 1 and by pulling on the body member 40, the tape 17 can be extended through the slot 16 to the desired length or distance. The body member 40 thus provides a convenient finger grip which eliminates the necessity of using the usual ring on the end of conventional tape measures.

As shown in FIGURE 2, after the tape has been extended the desired distance, the shoulder 33 may engage a surface such as the surface 45 of a member which may be a part of the member 25, and the lip 27 may engage a surface 44, whereby the magnetic attraction exerted by the shoulder 33 of the surface 45 will hold the support units 26 and its associated parts stationary in an extended position so as to facilitate the use of the tape measure for performing the various types of desired or required measurements. Also, with the parts in the position of FIGURE 2, it will be seen that after the support unit and tape have been moved to their desired extended position, the body member 40 can be pivoted or swivelled to the position shown in FIGURE 2 whereby the magnetic projections 42 will engage the metal surface 45 so that the body member 40 will be held in an out of the way position until it is again needed.

The parts can be made of any suitable material and in different shapes or sizes.

As shown in FIGURE 1 there is provided the magnet blocks 22 on the bottom of the shuttle case 11, and when the device is not being used, as compact assembly is insured. The magnets used with the present invention facilitate the use of the tape measure in various types of work, as for example the use of a tape measure on overhead ceiling measuring is greatly facilitated. The rivets or pins 19 help keep the tape circled in a normal position. The tape 17 is adapted to be calibrated or provided with scale markings to permit accurate measurements to be readily made. The end of the tape 17 is anchored to the lip 27 of the support unit 26 by means of the securing element 31. Due to the provision of the crosspiece 43 which is swivelly arranged in the recess 34, the horseshoe magnet or body member 40 can hinge and swing in a complete circle. The horseshoe magnet or member 40 will swing to the case 11 when the tape is not being used, or else it will cling or hold to a member such as the member 25 when the tape measure is being used. It is to be noted that the member 40 includes the leg portions 41 which are joined at one end by the crosspiece 43, while the other end portions of the legs 41 are separated from each other so as to provide or define a space therebetween, FIGURE 6.

The support unit 26 defines or constitutes a magnet head which is affixed to the tape 17 as at 31. The magnetic attraction will ensure that there will be positive closure of the tape when in the pocket. In addition the tape will be held in a positive manner on the end of a bar or any other metal member for measuring purposes. The member 40 provides a convenient hand grip to facilitate extension of the tape to the desired length, and by applying sufficient manual pressure to the device the magnetic holding attraction can be overcome in order to permit the parts to move to their desired position or location.

Minor changes in shape, size and rearrangement of details coming within the field of invention claimed may be resorted to in actual practice, if desired.

What is claimed is:

In a device of the character described, a case including a magnetically attractive end wall provide with a slot therein, a calibrated tape arranged for extensile and retractile movement through said slot and said tape having a portion thereof coiled inside of said case, a support unit having a lip affixed to said tape, and said support unit further including spaced apart magnetized shoulders arranged on opposite sides of said lips and engageable with the portions of said wall on opposite sides of said slot when said tape is in the retracted position, a magnetic horseshoe shaped body member having a portion thereof swivelly connected to said support unit, said body member including legs, and projections on the free ends of said legs, said projections facing toward said case and being spaced from the adjacent one of said shoulders so as to magnetically engage the portion of said end wall at a point spaced from said one shoulder when said tape is in retracted position, the space between said projections and said one shoulder providing an access opening for the fingers of a hand of the user.

References Cited in the file of this patent
UNITED STATES PATENTS

| | | |
|---|---|---|
| 992,170 | Crane | May 16, 1911 |
| 1,303,756 | Ballou | May 13, 1919 |
| 1,494,740 | Forbes | May 20, 1924 |
| 3,036,791 | Siggelkow | May 29, 1962 |